US008293867B2

(12) United States Patent
Messersmith et al.

(10) Patent No.: US 8,293,867 B2
(45) Date of Patent: Oct. 23, 2012

(54) SUBSTRATE-INDEPENDENT LAYER-BY-LAYER ASSEMBLY USING CATECHOL-FUNCTIONALIZED POLYMERS

(75) Inventors: Phillip B. Messersmith, Clarendon Hills, IL (US); Haeshin Lee, Chicago, IL (US); Yuhan Lee, Daejeon (KR); Zhongqiang Liu, Evanston, IL (US); Lesley Hamming, Durham, NC (US)

(73) Assignee: Northwestern University, Evanston, IL (US)

( * ) Notice: Subject to any disclaimer, the term of this patent is extended or adjusted under 35 U.S.C. 154(b) by 616 days.

(21) Appl. No.: 12/267,822

(22) Filed: Nov. 10, 2008

(65) Prior Publication Data
US 2009/0123652 A1 May 14, 2009

Related U.S. Application Data

(60) Provisional application No. 60/986,847, filed on Nov. 9, 2007.

(51) Int. Cl.
*C08F 26/02* (2006.01)
*C08G 65/48* (2006.01)
*C08G 73/04* (2006.01)
(52) U.S. Cl. .............. 528/424; 525/328.2; 528/327
(58) Field of Classification Search .............. None
See application file for complete search history.

(56) References Cited

U.S. PATENT DOCUMENTS

| 2,927,096 | A | * | 3/1960 | Soloway | 528/153 |
|---|---|---|---|---|---|
| 5,643,456 | A | * | 7/1997 | Smith et al. | 210/651 |
| 5,817,610 | A | * | 10/1998 | Honda et al. | 510/176 |
| 2005/0201974 | A1 | * | 9/2005 | Schestopol et al. | 424/78.27 |
| 2005/0249799 | A1 | * | 11/2005 | Jacob et al. | 424/451 |

FOREIGN PATENT DOCUMENTS

| CN | 1557845 A | 12/2004 |
|---|---|---|
| WO | 2005056708 A2 | 6/2005 |
| WO | 2007022645 A1 | 3/2007 |
| WO | WO 2007022645 A1 * | 3/2007 |
| WO | 2007127225 A2 | 11/2007 |

OTHER PUBLICATIONS

Bergbreiter, Polyethylene Surface Chemistry, Prog. Polym. Sci., 1994, 19:529-560.
Boura, et al., Endothelial Cells Grown on Thin Polyelectrolyte Multilayered Films: An Evaluation of a New Versatile Surface Modification, Biomaterials, 2003, 24:3521-3530.
Crisp, et al., Adhesion and Substrate Choice in Mussels and Barnacles, J. Coll. Inter. Sci., 1985, 104:40-50.
Decher, et al., Buildup of Ultrathin Multilayer Films by a Self-Assembly Process, Makromol. Chem. Macromol. Symp., 1991, 46:321-327, Abstract Only.
Delcorte, et al., Adsorption of Polyelectrolyte Multilayers on Polymer Surfaces, Langmuir, 1997, 13:5125-5136.
Hammond, Form and Function in Multilayer Assembly: New Applications at the Nanoscale, Adv. Mater., 2004, 16:1271-1293.
Ho, et al., Nanoseparated Polymeric Networks with Multiple Antimicrobial Properties, Adv. Mater., 2004, 16:957-961.
Hsieh, et al., Surface "Priming" for Layer-by-Layer Deposition: Polyelectrolyte Multilayer Formation on Allylamine Plasma-Modified Poly(tetrafluoroethylene), Macromolecules, 1997, 30:8453-8458.
Khademhosseini, et al., Direct Patterning of Protein- and Cell-Resistant Polymeric Monolayers and Microstructures, Adv. Mater., 2003, 15:1995-2000.
Lee, et al., Single-Molecule Mechanics of Mussel Adhesion, PNAS, 2006, 103:12999-13003.
Lee, et al., A Reversible Wet/Dry Adhesive Inspired by Mussels and Geckos, Nature, 2007, 448:338-342.
Lee, et al., Mussel-Inspired Surface Chemistry for Multifunctional Coatings, Science, 2007, 318:426-430.
Lutkenhaus, et al., Elastomeric Flexible Free-Standing Hydrogen-Bonded Nanoscale Assemblies, J. Am. Chem. Soc., 2005, 127:17228-17234.
Murray, et al., Shape- and Size-Selective Electrochemical Synthesis of Dispersed Silver(I) Oxide Colloids, Nano Letters, 2005, 5:2319-2324.
Pardo-Yissar, et al., Layered Polyelectrolyte Films on Au Electrodes: Characterization of Electron-Transfer Features at the Charged Polymer Interface and Application for Selective Redox Reactions, Langmuir, 2001, 17:1110-1118.
Picart, et al., Buildup Mechansim for Poly(L-lysine)/Hyaluronic Acid Films onto a Solid Surface, Langmuir, 2001, 17:7414-7424.
Podsiadlo, et al., Fusion of Seashell Nacre and Marine Bioadhesive Analogs: High-Strength Nanocomposite by Layer-by-Layer Assembly of Clay and L-3,4-Dihydroxzyphenylalanine Polymer, Adv. Mater., 2007, 19:949-955.
Price, et al., Sonochemically-Assisted Modification of Polyethylene Surfaces, Macromolecules, 1996, 29:5664-5670.
Raposo, et al., Kinetics of Adsorption of Poly(o-methoxyaniline) Self-Assembled Films, Macromolecules, 1997, 30:6095-6101.
Sasaki, et al. Titania Nanostructured Films Derived from a Titania Nanosheet/Polycation Multilayer Assembly Via Heat Treatment and UV Irradiation, Chem. Mater., 2002, 14:3524-3530.
Tang, et al., Biomedical Applications of Layer-by-Layer Assembly: From Biomimetics to Tissue Engineering, Adv. Mater., 2006, 18:3203-3224.
Thierry, et al., Nanocoatings onto Arteries Via Layer-by-Layer Deposition: Toward the in Vivo Repair of Damaged Blood Vessels, J. Am. Chem. Soc., 2003, 125:7494-7495.
Vicente, et al., Anti-Adhesive Properties of Polytetrafluoroethylene (Gore-Tex) in Middle Ear Surgery. An Experimental Study, Acta Oto-Laryngologica, 2006, 126:144-148.
Waite, et al., Mussel Adhesion: Finding the Tricks Worth Mimicking, Journal of Adhesion, 2005, 81:297-317.
Zhao, et al., Fabrication of a Molecular-Level Multilayer Film on Organic Polymer Surfaces Via Chemical Bonding Assembly, Langmuir, 2007, 23:1810-1814.
PCT International Search Report, PCT/US2008/082973, Nov. 25, 2009.
PCT International Preliminary Report on Patentability, PCT/US2008/082973, May 11, 2010.

* cited by examiner

*Primary Examiner* — Robert Sellers
(74) *Attorney, Agent, or Firm* — Quarles & Brady LLP

(57) ABSTRACT

The present invention provides a simple, non-destructive and versatile method that enables layer-by-layer (LbL) assembly to be performed on virtually any substrate. A catechol-functionalized polymer which adsorbs to virtually all surfaces and can serve as a platform for LbL assembly in a surface-independent fashion is also provided.

6 Claims, 10 Drawing Sheets a). KOH/methanol; b). DHPA(acetonide)-NHS;
c). TFA/DMSO/TIS/water (20:70:2.5:7.5)

SUBSTRATE-INDEPENDENT LAYER-BY-LAYER ASSEMBLY USING CATECHOL-FUNCTIONALIZED POLYMERS

CROSS-REFERENCE TO RELATED APPLICATIONS

This application claims priority to U.S. Provisional Application No. 60/986,847 filed Nov. 9, 2007, the entirety of which is hereby incorporated by reference for all purposes.

STATEMENT REGARDING FEDERALLY SPONSORED RESEARCH

This invention was made with government support under Grant No. DE014193 and DE018350 awarded by the National Institutes of Health. The United States government has certain rights in this invention.

BACKGROUND

Layer-by-layer (LbL) assembly allows one to create multifunctional films on surfaces while maintaining the bulk properties of the individual surfaces [1]. The method relies on sequential adsorption of polymers onto bulk surfaces from solution, giving rise to complex multifunctional, multilayered films. LbL assembly is simple to implement and offers extensive control over film properties and composition during stepwise adsorption of components.

Although the vast majority of LbL films are built from polyelectrolytes via electrostatic interaction between layers, more recently LbL films have been made with hydrogen bonding of polymers [2], and other building blocks such as inorganic nanoparticles, giving access to even greater control of chemical and physical properties of LbL films.

In principle, LbL assembly can be performed on a wide variety of substrates, including noble metals (Au, Pt, etc.), oxides (quartz, Si, $TiO_2$, mica etc.), and synthetic polymers (polyethylene terephthalate (PET), poly(methyl methacrylate) (PMMA), polyetherimide, etc.) [3,4]. In practice, however, forming well-ordered LbL layers on many polymeric surfaces has proven challenging [5-7], and LbL assembly on hydrophobic polymers such as poly(tetrafluoroethylene) (PTFE), and polyethylene (PE) often requires aggressive 'priming' methods such as plasma treatments [5,7], oxidative chemical reactions (piranha/persulfonation) [8,9], or polymeric adsorption [6,10,11].

Accordingly, a need exists for catechol-functionalized polymers for use in LbL assembly of multifunctional films wherein the polymers allow substrate-independent LbL assembly.

SUMMARY OF THE INVENTION

Figure 1:
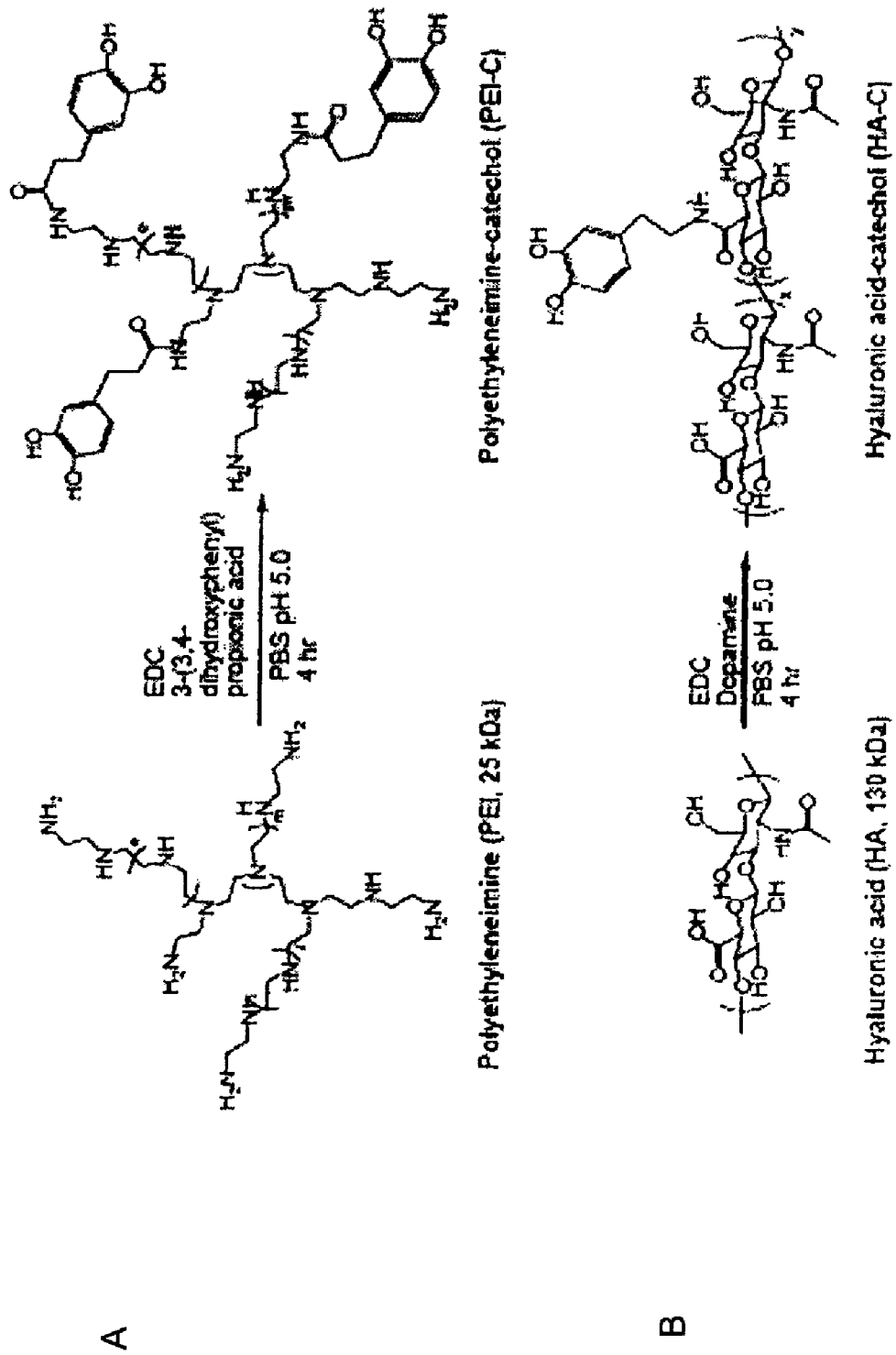
FIG. 1. Synthesis of catechol-containing polymers. (A) Catechol-functionalized Polyethyleneimine (PEI-C). (B) Catechol-functionalized Hyaluronic Acid (HA-C).
Figure 2:
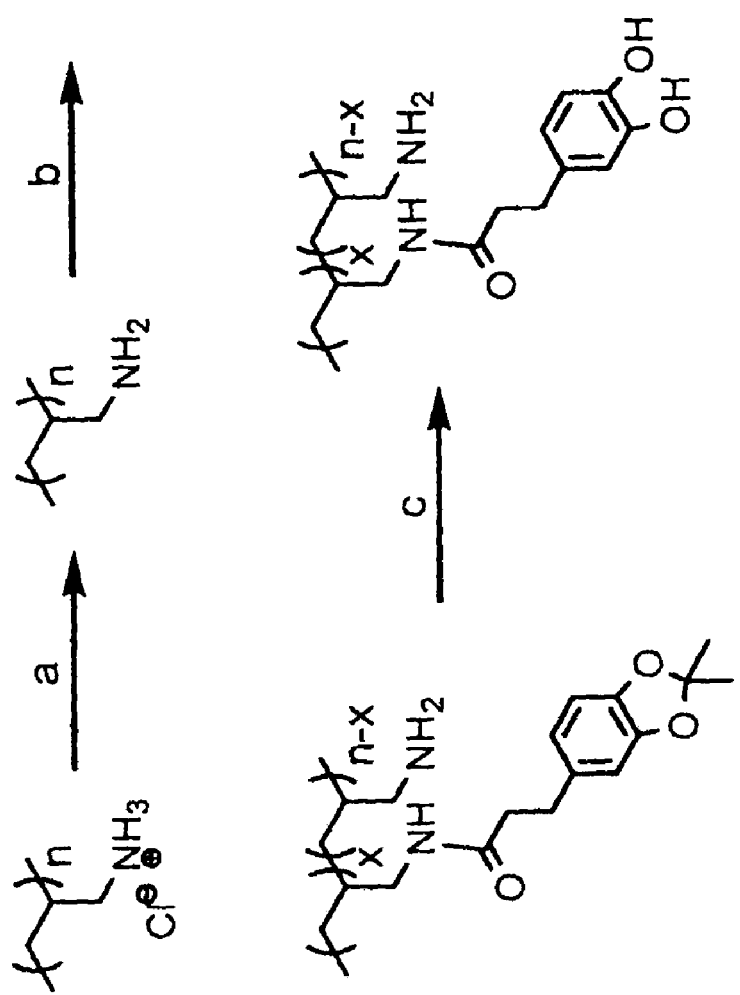
FIG. 2. Synthesis of catechol-functionalized poly(allylamine) (PAA-DHPA).

The present invention provides methods and catechol-functionalized polymers for use in substrate independent layer-by-layer assembly of multifunctional films.

In one embodiment, the invention provides a catechol-functionalized polymer comprising at least 1 to 70 percent catechol functional groups. In a preferred embodiment, the polymer comprises 50 to 65 percent catechol functional groups, and may comprise any anionic or cationic polymer.

In a second embodiment, the invention provides catechol-functionalized polymer comprising the structure:

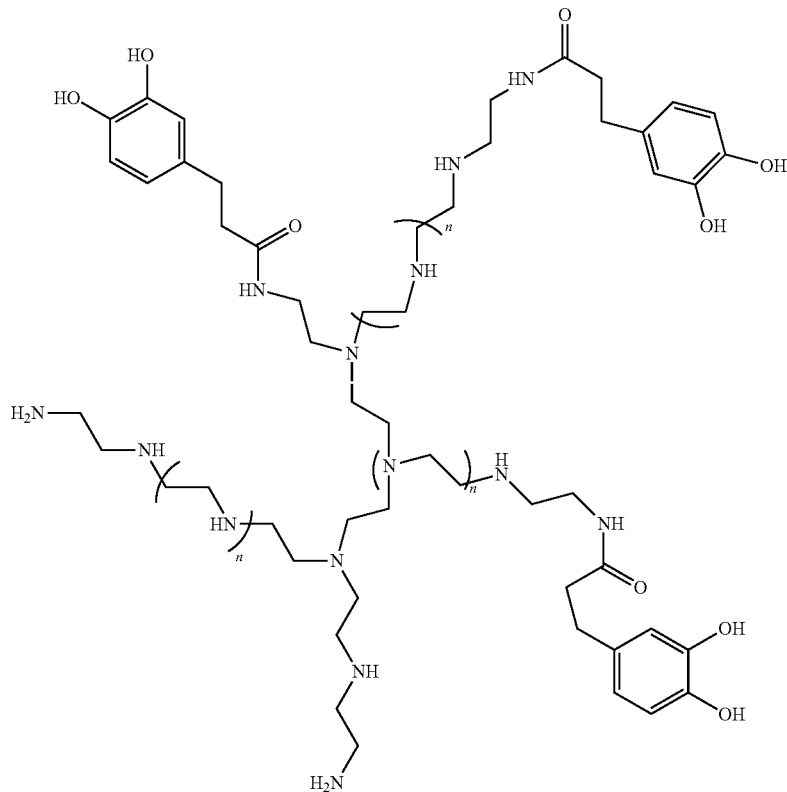

wherein "n" has a value in the range of from 10 to 10,000 and "m" has a value in the range of from 1 to 5,000. Preferably the polymer has a molecular weight of at least 25 kDa and comprises at least 20 to 60 percent catechol functional groups.

In a third embodiment, the invention provides a catechol-functionalized polymer comprising the structure:

wherein "x" has a value in the range from 10 to 10,000 and "y" has a value in the range from 1 to 5,000. In a preferred embodiment, "x" is 221 and "y" is 122.

In a fourth embodiment, the invention provides a catechol-functionalized polymer comprising the structure:

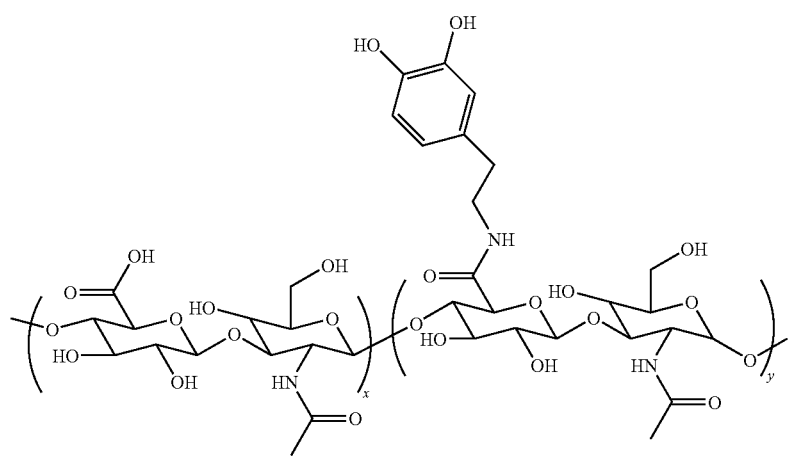

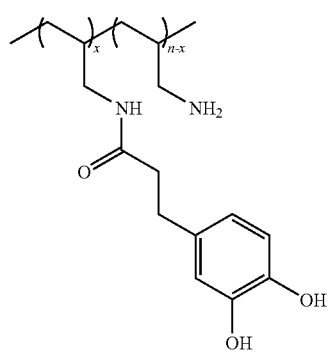

wherein "n" has a value in the range from 10 to 10,000 and "x" has a value in the range from 1 to 5,000.

In a fifth embodiment, the invention provides a substrate-independent method for the layer-by-layer assembly of a multifunctional film. The method comprises the steps of: (a) contacting a substrate with a first catechol-functionalized polymer to form a first layer; (b) rinsing the substrate with neat solvent; (c) contacting the substrate with a second catechol-functionalized polymer to form a second layer; (d) rinsing the substrate with neat solvent, wherein steps (a) through (d) are repeated until a multifunctional multilayer film is formed.

In a preferred embodiment, the first catechol-functionalized polymer comprises the structure:

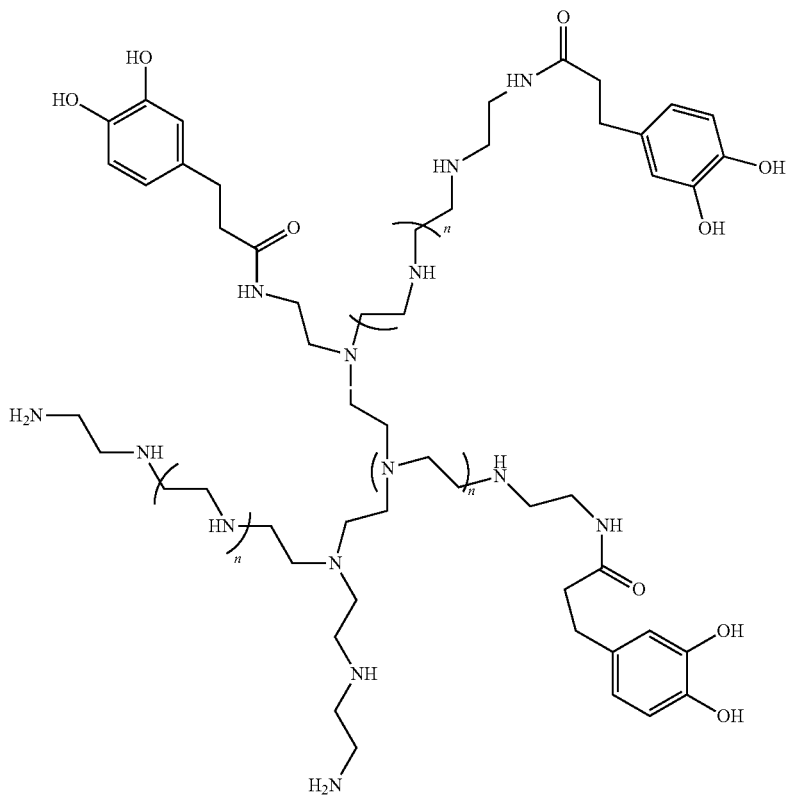

wherein "n" has a value in the range from 10 to 10,000 and "m" has a value in the range of from 1 to 5,000.

In a further preferred embodiment, the second catechol-functionalized polymer comprises the structure:

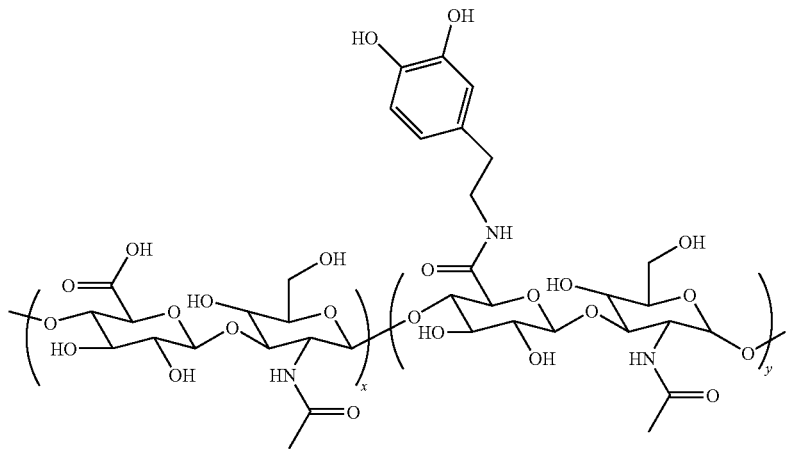

wherein "x" has a value in the range from 10 to 10,000 and "y" has a value in the range from 1 to 5,000.

In a sixth embodiment, the present invention provides a substrate-independent method for the layer-by-layer assembly of a multifunctional film comprising the steps of: (a) contacting a substrate with a first catechol-functionalized polymer to form a first layer; (b) rinsing the substrate with neat solvent; (c) contacting the substrate with a second substance having an affinity for the first layer to form a second layer; (d) rinsing the substrate with neat solvent, wherein steps (a) through (d) are repeated until a multifunctional multilayer film is formed.

Preferably, the first catechol-functionalized polymer comprises the structure:

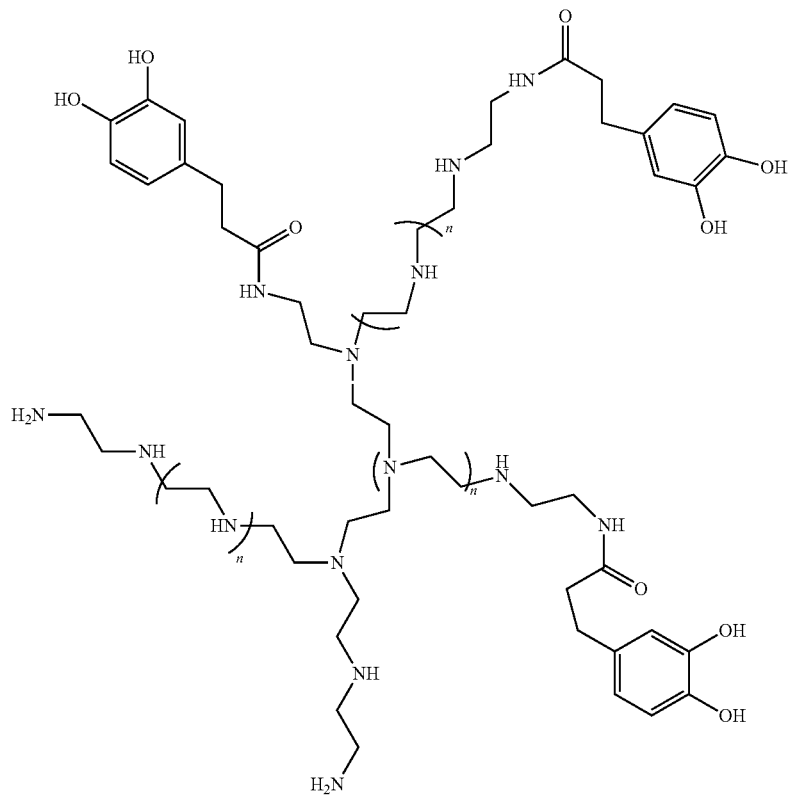

wherein "n" has a value in the range from 10 to 10,000 and "m" has a value in the range of from 1 to 5,000.

Advantageously, the present invention provides catechol-functionalized polymers for use in methods of substrate-independent LbL assembly of multifunctional films. The polymers of the present invention enable a simple, non-destructive and versatile method that enables LbL assembly to be performed on virtually any substrate. The invention provides an efficient and effective approach to substrate-independent LbL assembly by exploiting the strong interfacial binding property of the catechol-functionalized polymers described in the present invention.

The polymers and methods of the present invention avoid the need for aggressive chemical or physical pre-treatment regimens of substrates normally required for LbL on challenging substrates such as neutral and hydrophobic polymers. The inventors have found that augmenting the number of catechol groups in a polymer structure provides superior adhesive strength and water resistance while maintaining the unique properties of the unmodified polymer.

The catechol-functionalized polymers of the present invention adsorb to virtually all surfaces and can serve as a platform for LbL assembly in a surface-independent fashion.

DETAILED DESCRIPTION

I. In General

In the specification and in the claims, the terms "including" and "comprising" are open-ended terms and should be interpreted to mean "including, but not limited to . . . . " These terms encompass the more restrictive terms "consisting essentially of" and "consisting of."

As used herein and in the appended claims, the singular forms "a", "an", and "the" include plural reference unless the context clearly dictates otherwise. As well, the terms "a" (or "an"), "one or more" and "at least one" can be used interchangeably herein. It is also to be noted that the terms "comprising", "including", "characterized by" and "having" can be used interchangeably.

This invention is not limited to the particular methodology, protocols, and reagents described, as these may vary. The terminology used herein is for the purpose of describing particular embodiments only, and is not intended to limit the scope of the present invention which will be limited only by the appended claims.

Unless defined otherwise, all technical and scientific terms used herein have the same meanings as commonly understood by one of ordinary skill in the art to which this invention belongs. All publications and patents specifically mentioned herein are incorporated by reference in their entirety for all purposes including describing and disclosing the chemicals, instruments, statistical analyses and methodologies which are reported in the publications which might be used in connection with the invention. All references cited in this specification are to be taken as indicative of the level of skill in the art. Nothing herein is to be construed as an admission that the invention is not entitled to antedate such disclosure by virtue of prior invention.

Although any methods and materials similar or equivalent to those described herein can be used in the practice or testing of the present invention, the preferred methods and materials are now described.

II. The Invention

The present invention provides catechol-functionalized polymers for use in layer-by-layer assembly of multifunctional films and methods of use thereof.

Catechol-Functionalized Polymers. The present invention provides catechol-functionalized polymers for use in layer-by-layer assembly of multifunctional films. By "catechol-functionalized" we mean modifying a polymer to increase the number of catechol functional groups existing in the polymer structure. By "catechol functional group" we mean the organic compound with the formula:

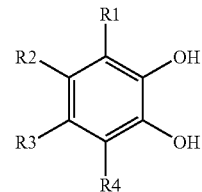

where R1, R2, R3 and R4 may be hydrogen, an organic group including but not limited to such groups as an alkyl or aryl group, or a carboxylate or sulfonate group. In an alternative embodiment, the polymer may also be functionalized with pyrogallol, where 3 OH groups are on an aromatic ring in the 3, 4, 5 or 2, 3, 4 positions.

The resulting modified polymer structure includes an additional number of covalently bonded catechol functional groups beyond those which may already exist in the unmodified polymer structure. In particular, the additional catechol groups are introduced in terminal and/or pendant positions in the polymer structure. As a result of their terminal and/or pendant position, the additional catechol groups are free for substrate adhesive bonding and crosslinking. These additional free functional groups typically are covalently bonded to the polymer via linking groups such as amides, ethers, urethanes or esters.

The catechol-functionalized polymers of the present invention preferably contain at least 20 to 30 weight percent additional catechol functional groups. However, the polymer may be modified to incorporate anywhere from about 0.1 weight percent to about 90 weight percent additional catechol groups, based on the total weight of the modified polymer. In a preferred version, the polymer may be modified to incorporate about 1 to 70 weight percent additional catechol groups. In a further preferred version, the polymer may be modified to incorporate about 2 to 50 weight percent catechol groups.

The catechol-functionalized polymers of the present invention can be of any size, although preferably, x+y=10 to 10000 and y=1-90% of total (x+y). The catechol-functionalized polymers of the present invention also may have a molecular weight in the range of 5 to 1,000,000 kDa, although in a preferred version the polymers have a molecular weight of 20 to 500 kDa.

While the present application describes the synthesis of three catechol-functionalized polymers, catechol-functionalized poly(ethylenimine) (PEI-C), catechol-functionalized hyaluronic acid (HA-C) and catechol-functionalized poly(allylamine) (PAA-DHPA), any polymers useful in LbL assembly may be functionalized for use in this invention, including but not limited to any polycation or polyanion of biological, semi-synthetic or synthetic origin.

Methods of Use. The present invention also provides methods of substrate-independent Layer-by-Layer (LbL) assembly of multifunctional films using at least one of the catechol-functionalized polymers of the present invention.

In use, LbL assembly is carried out in a conventional manner according to the following steps. One, a substrate is dipped in a first catechol-functionalized polymer. Two, the substrate is rinsed in neat solvent, such as deionized water, methanol or other suitable compositions until substantially free of the catechol-functionalized polymer being applied. Three, the substrate is dipped in a second substance, the second substance having an affinity for the first substance. The second substance may be a second catechol-functionalized polymer of the present invention or another substance having an affinity for the first catechol-functionalized polymer. Finally, the substrate is rinsed again in neat solvent. These steps are repeated in a cyclic fashion until the desired number of layers have been deposited on the substrate. The desired number of layers is achieved when the required thickness or the desired properties are achieved.

As used herein, one substance can be said to have an affinity for another substance via either an electrostatic attraction or by virtue of van der Waals' forces, hydrogen bond forces, electron exchange or other types of chemical interactions.

For instance, in a preferred embodiment, the first catechol-functionalized polymer comprises a positively charged polyelectrolyte. The electrostatic attraction between the polyelectrolyte and the substrate results in the adsorption of a layer of polyelectrolyte to the substrate. The second substance is preferably a negatively charged material such as, by way of example and not limitation, polyelectrolyte, polymers, proteins, dyes, metal and semiconductor nanoparticles, magnetic nanoparticles, vesicles, viruses, DNA, RNA and the like.

Substitutions of polymers/substances with a like charge or affinity may be made for the first and second substances to achieve the sequential adsorption of layers of a plurality of polymers/substances resulting in desired properties.

The sequence of the layers is determined by the order of dipping. The polymers/substances adsorbed at various layers may be easily varied such that layers of different materials can be combined depending on the required functionality or combination of functions required. Thus, sequential adsorption of monolayers of polyelectrolytes, dyes, nanoparticles (metal, semiconducting, magnetic, etc.), polymers, proteins, vesicles, viruses, DNAs, RNAs, oligonucleotides, organic and inorganic colloids and other substances on layers of, for example, a polyelectrolyte having an affinity therefore, allows for the unprecedented control over film structure, production of multifunctional membranes, incorporation of biological compounds into the film while retaining their biological activity, and improvement of the performance of the film in most applications.

Substrate Independent. The catechol-functionalized polymers of the present invention facilitate LbL assembly on a wide variety of substrates, a strategy referred to by the inventors as substrate-independent layer-by-layer (siLbL) assembly. For instance, in addition to the traditional substrates commonly used in LbL assembly, the catechol-functionalized polymers of the present invention allow LbL assembly on substrates including but not limited to metal, oxide and polymer substrates.

For instance, a large number of medical devices are made out of poly(tetrafluoroethylene), and this material is traditionally difficult to surface modify. The polymers and methods of the present invention can be used to provide surface modification of devices made with poly(tetrafluoroethylene) for such thing as incorporating antibiotic drugs or silver nanoparticles for enhancing bacterial resistance of medical devices, or incorporating DNA onto device surfaces for purposes of gene therapy. In this case the DNA itself can be employed as a polyanion in the LbL strategy. The LbL films can have nonmedical uses also, such as for example acting as adhesion promoters for applying other coatings to inert or typically difficult surfaces like polyethylene, etc.

Universal Primer. PEI-C also functions as a universal primer to facilitate subsequent LbL with other polymers. The inventors demonstrated this concept on a silicon wafer with poly(acrylic acid) (PAA) and poly-L-lysine (PLL), two polymers that have a history of use in LbL assembly [19].

Enhanced Function. Certain functional properties of LbL films may be enhanced by incorporation of catechol residues into LbL films. For example, the strong interaction of catechols with surfaces [20,21] suggests that LbL films deposited onto a primer layer of PEI-C should enhance adhesion and help prevent delamination of LbL films from substrate surfaces. Likewise, catechols could enhance mechanical properties within LbL composite films. Accordingly, the catechol-functionalized polymers of the present invention demonstrate a useful functional property of LbL multilayer films constructed from said catechol-containing polymers.

Reducing Agent. The catechol groups in the LbL film are redox active and therefore can function as a reducing agent to oxidize metal ions, as previously demonstrated for spontaneous electroless Ag and Cu metallization of catecholamine polymer coated surfaces from aqueous metal salt solutions [14]. By utilizing the latent reactivity of catechol functional groups in the catechol-functionalized polymers of LbL films for in-situ reduction of metal ions within the LbL multilayer film, the functionality of the LbL film can be designed to impart, for instance, an antibacterial property to the multilayer film. In addition, oxidation of catechol-containing LbL films through treatment with a chemical or enzymatic oxidizer, or by use of alkaline pH, can be used to covalently cross-link catechols to each other or to other functional groups, which in turn can improve the rigidity and strength of the LbL film.

Kits. In an alternate embodiment of the invention, a kit for preparing the polymers of the present invention is provided. In one embodiment, the kit comprises at least one of the catechol-functionalized polymers of the present invention and instructions for use.

By "instructions for use" we mean a publication, a recording, a diagram, or any other medium of expression which is used to communicate the usefulness of the invention for one of the purposes set forth herein. The instructional material of the kit can, for example, be affixed to a container which contains the present invention or be shipped together with a container which contains the invention. Alternatively, the instructional material can be shipped separately from the container or provided on an electronically accessible form on a internet website with the intention that the instructional material and the biocompatible hydrogel be used cooperatively by the recipient.

The following examples are, of course, offered for illustrative purposes only, and are not intended to limit the scope of the present invention in any way. Indeed, various modifications of the invention in addition to those shown and described herein will become apparent to those skilled in the art from the foregoing description and the following examples and fall within the scope of the appended claims.

III. Examples

Example 1

Synthesis of Catechol-Functionalized Polymers

Catechol-functionalized Polyethylenimine (PEI-C). Poly(ethylenimine) (PEI), a cationic polymer with a history of use in LbL assembly [10,15], was conjugated with 3-(3,4-dihydroxyphenyl)propionic acid to make catechol-functionalized PEI (PEI-C) (FIG. 1A). The degree of catechol modification in PEI-C was 63% as determined by the ninhydrin test, thereby preserving the cationic character of the polymer for use in LbL while at the same time mimicking the high catechol content of mussel adhesive proteins [12].

3 g of PEI ($M_w$=25 ikDa, Sigma-Aldrich) was dissolved in 300 ml of PBS solution adjusted to pH 5.5 using 1 N HCl solution. 1.52 g (17.4 mmol) of 3-(3,4-dihydroxyphenyl) propionic acid and 2.71 g (34.9 mmol) of EDC were added, and the pH of the reaction solution was maintained at 5.5 for 2 hour with 1.0 N NaOH. Unreacted chemicals and urea byproducts were removed by extensive dialysis. Degree of substitution was determined by ninhydrin test.

Catechol-functionalized Hyaluronic Acid (HA-C). Hyaluronic acid (HA) is a linear polysaccharide found in the extracellular matrix (ECM) of connective tissues and has been used in LbL assembly [16,17]. A catechol-modified HA was synthesized by reacting dopamine with HA in the presence of EDC, yielding HA-catechol (HA-C) with 35.6% of carboxyl groups modified by dopamine (FIG. 1B).

1 g of HA ($M_w$=130 kDa, Lifecore) was dissolved in 100 ml of PBS solution adjusted to pH 5.5 using 1 N HCl solution. 388.1 mg (2.5 mmol) of EDC and 474.1 mg (2.5 mmol) of dopamine hydrochloride were added, and the pH of the reaction solution was maintained at 5.5 for 2 hours with 1.0 N NaOH. This reaction resulted in modification of 35.6% of primary amine groups.

Catechol-functionalized Polyallylamine (PAA-DHPA). Polyallylamine (PAA) is a cationic polyelectrolyte that can be used in combination with an anionic polyelectrolyte like poly(sodium styrene sulfonate) to form a layer-by-layer adsorbed film of negatively and positively charged polymers.

5 g PAA (53 mmol monomer units, Mw=65 kDa, Sigma-Aldrich) was dissolved in 100 mL anhydrous methanol. Upon addition of potassium hydroxide (2.9 g, 53 mmol), a white precipitate appeared and was removed by filtration and the filtrate was added with dry DMF, followed by reduction of methanol by rotary evaporation and addition of NHS ester of acetonide protected 3-(3,4-dihydroxyphenyl)propanoic acid (DHPA-NHS) (1.7 g, 5.3 mmol). The mixture was stirred under argon protection for one day. After the volatile was reduced by vacuum, cold dry ether was added to produce a white precipitate, which was collected by centrifuge. The obtained solid was subject to acetonide-deprotection in 100 mL of DMSO/TFA/TIS/water (20:70:2.5:7.5) overnight to yield catechol grafted polyallylamine. The modification degree was estimated by $^1$H NMR and could be controlled by the molar ratio of DHPA-NHS and poly(allylamine) monomer units.

Example 2

Layer-By-Layer Assembly

In this example, the inventors demonstrate the Layer-by-Layer (LbL) assembly of films on various substrates.

PTFE, PE, PC, PET, PMMA, Si, and Au surfaces were ultrasonically cleaned in deionized water for 5 min and transferred to the PEI-C and HA-C solutions (5 mg/mL in water, pH 6.5) for LbL assembly. The following cycle was generally used: (1) PEI-C for 3 min, (2) wash in water for 1 min, (3) HA-C for 3 min, and (4) wash in water for 1 min. For PTFE, the first PEI-C/HA-C adsorption was carried out for 2 hrs, and subsequent steps were same as described. A control experiment involving LbL on PTFE using as-supplied PEI (no catechol) in each assembly step was performed with overnight adsorptions (18-24 hrs). The same method was used for heterogeneous assembly of PEI-C/PAA ($M_w$=90 kDa, Polysciences) followed by alternating PLL/PAA adsorption. Concentrations of PAA and PLL (Ave $M_w$=28,000 Da, Sigma-Aldrich) were 3 mg/mL in 10 mM Tris, pH 7.0.

Characterization. Spectroscopic ellipsometry (Woollam Co., Inc. Lincoln, Nebr.) was used to determine the film thickness. AFM surface topography was measured in air using an MFP-3D atomic force microscopy (Asylum Research, San Diego, Calif.) operated in AC and contact modes. X-ray photoelectron spectroscopy (Omicron ESCALAB) (Omicron, Taunusstein, Germany) was performed to measure surface atomic composition. XPS is configured with a monochromated Al Ka (1486.8 eV) 300-W X-ray source with an ultrahigh vacuum ($<10^{-8}$ Torr). The takeoff angle was fixed at 450, and all spectra were calibrated using the hydrocarbon C(1s) peak (284.5 eV).

Bactericidal testing E. coli (ATCC 35218) was grown in MHB (Mueller-Hinton Broth, cation adjusted) at 37° C. for 24 h from previously frozen inoculums. Substrates were sterilized by UV treatment and incubated at 37° C. with 1 mL of phosphate buffered saline (PBS) containing ~$10^5$ CFU/mL E. coli for 4 hrs with mild agitation. Substrates were rinsed with PBS and stained with Syto 9 and propidium iodide in PBS (2 uL/mL) for 10 min and then mountained on glass slides. Attached bacteria were imaged using a Leica epifluorescence microscope (40×mag).

Example 3

LbL Assembly on PTFE

Figure 3:
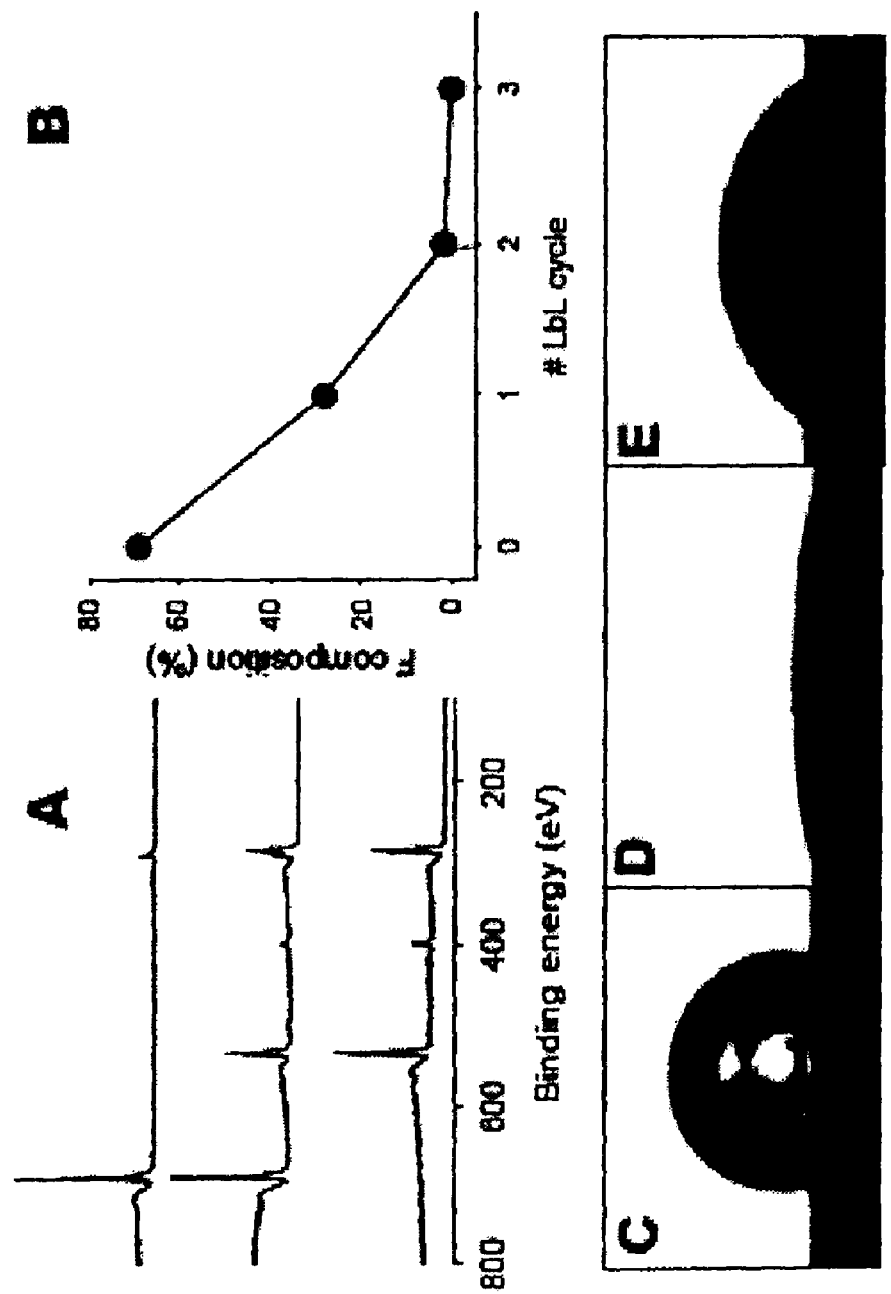
FIG. 3. Layer-by-layer assembly on PTFE. (A) XPS spectra of bare PTFE (top), after the first cycle assembly of PEI-C/HA-C (middle), after three cycles (bottom). (B) Surface composition of fluorine (F1s) as a function of the number of LbL deposition cycles of PEI-C/HA-C. (C-E) Wetting of water on bare PTFE (C, $\theta_{stat}=106°$), PTFE after three cycles of LbL assembly using PEI-C and HA-C (D, $\theta_{stat}=19.7°$), and PTFE after three cycles assembly using PEI and HA (E, $\theta_{stat}=55.4°$).

The inventors first demonstrated LbL assembly on PTFE, an example of a particularly challenging substrate for LbL due to its anti-adhesive property [18]. The progress of LbL assembly was monitored by X-ray photoelectron spectroscopy (XPS) as shown in FIG. 3. The intensity of fluorine 1s (F1s) (690 eV) and carbon 1s (C1s) (292 eV, C-F) peaks from bare PTFE (FIG. 3A, top) decreased after the first cycle of PEI-C/HA-C assembly (FIG. 3A, middle) and completely disappeared after only three cycles (FIG. 3A, bottom). The fluorine composition at the PTFE surface decreased from 69 percent initially to only 1.6 percent after two-cycles of PEI-C/HA-C assembly (FIG. 3B), demonstrating well-controlled LbL deposition on untreated PTFE. Contact angle measurements clearly showed the stark contrast in wetting characteristics of the PTFE surface before and after LbL assembly (FIG. 3C-D); the advancing contact angle ($\theta_{adv}$) decreased from 115° for unmodified PTFE to 27.8° after three-cycle assembly (PEI-C/HA-C)$_3$. The importance of the catechol functionality in effective LbL on PTFE was illustrated by poor wetting ($\theta_{adv}$=69.5°) when unmodified PEI and HA were used under the condition of significantly extended adsorption times (18~24 hrs per each assembly) (FIG. 3E).

Example 4

LbL Assembly on Noble Metals, Oxides and Polymer Substrates

In this example, the inventors demonstrate the substrate versatility of the catechol-functionalized polymers of the present invention.

Figure 4:
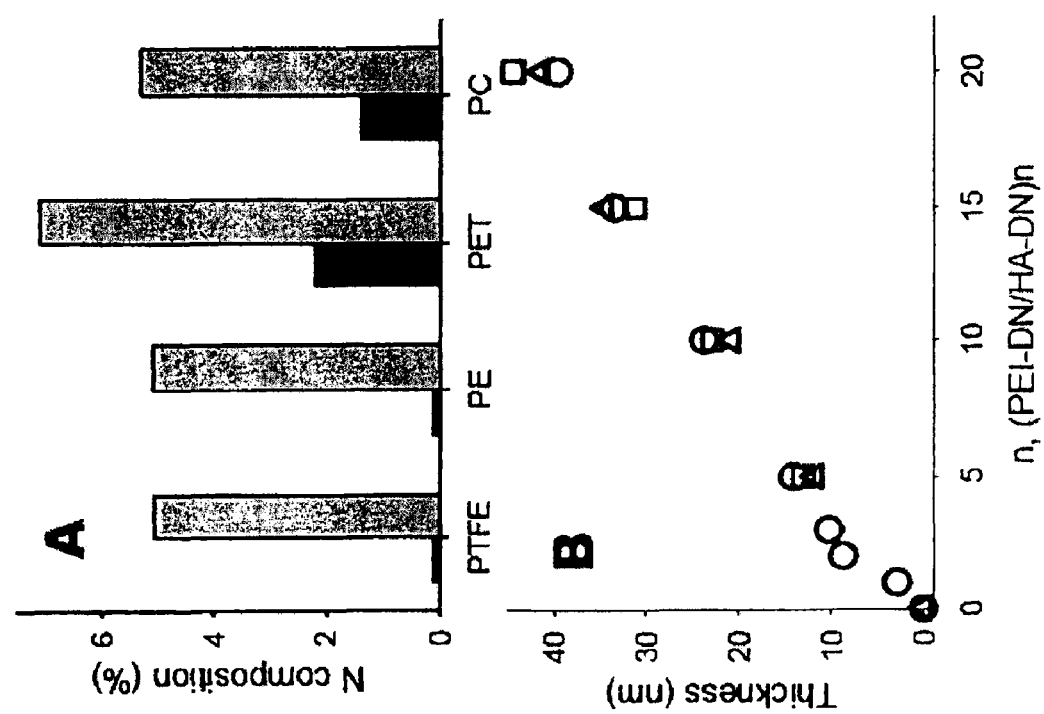
FIG. 4. Substrate-independent LbL assembly using PEI-C and HA-C. (A) XPS surface nitrogen composition on various organic polymer surfaces after adsorption of PEI (black) or PEI-C (gray). (B) Ellipsometric polymer film thickness versus number of cycles of PEI-C/HA-C adsorption on $SiO_x$ (circles), Au (triangles), and PMMA (squares).

LbL assembly on a variety of organic and inorganic surfaces was facilitated using alternating cycles of PEI-C/HA-C adsorption. The inventors used Au, SiO$_x$, and PMMA as representatives of noble metal, oxide, and polymer substrates, respectively. Ellipsometric measurement of film thickness resulting from PEI-C/HA-C adsorption revealed a film deposition rate of 2.1 nm/cycle (n) regardless of substrate (FIG. 4B). LbL assembly was also performed on several other polymeric surfaces (PE, PET, and polycarbonate (PC)) generally considered to be difficult to functionalize without prior surface modification. Comparative XPS studies of PEI vs. PEI-C adsorption on these substrates confirmed the importance of catechol residues in first layer adsorption. For example, the nitrogen signal (N1s), a useful indicator due to its presence in PEI-C chains but not in the substrate, showed that PE was anti-adsorptive to PEI but was readily modified by PEI-C. On PET and PC, trace amounts of nitrogen were detected following adsorption of PEI, although the nitrogen amount was higher when PEI-C was used. Quantitative XPS analysis of surfaces modified by PEI-C all contained similar nitrogen levels (5-7 percent) regardless of substrate, whereas PEI modification of the same surfaces yielded uniformly low nitrogen content (0-2 percent) (FIG. 4A).

Example 5

In-Situ Reduction of Metal Ions within the LbL Multilayer

In this example, the inventors demonstrate that the catechol-functionalized polymers of the present invention can be used for the in situ reduction of metal ions.

Figure 6:
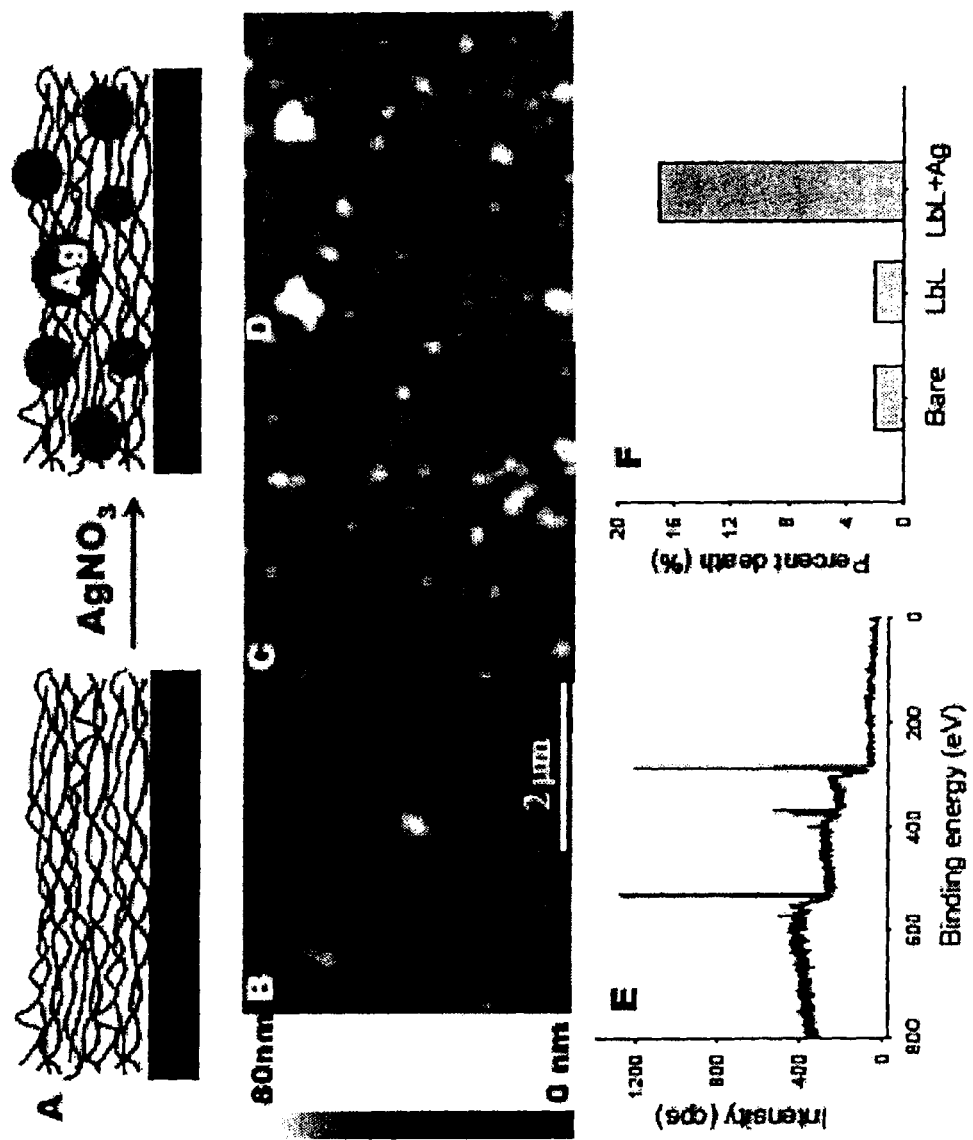
FIG. 6. Catechol-mediated silver nanoparticle formation in LbL films of PEI-C/HA-C and antibacterial activity of the nanocomposite films. (A) Schematic illustration of Ag nanoparticle formation in LbL film via catechol oxidation in the presence of Ag(III). (B-D) Topographic AFM images of the LbL film after PEI-C/HA-C (n=20) deposition (B), and the same film incubated in 1 mM $AgNO_3$ solution for 30 min (C) and 18 hrs (D). (E) XPS spectra of the silver incorporated LbL film shown in D (18 hrs). Metallic silver photoelectron (3 $d_{5/2}$) was detected at the binding energy of 368.4 eV. (F). Live-dead assay of adhered E. coli on bare Si, LbL (n=20), and LbL+Ag (n=20, 18 hrs) surfaces.

Specifically, the latent reactivity of catechol functional groups in PEI-C/HA-C LbL films was used for in-situ reduction of Ag(III) to Ag(0) within the LbL multilayer (FIG. 6A). First, LbL films of PEI-C/HA-C (n=20) were assembled on SiO$_x$. Subsequently, the LbL film and substrate were transferred to a silver nitrate solution (1 mM), upon which AFM imaging of the surface revealed topological changes corresponding to Ag nanoparticle formation. XPS analysis indicated a strong signal at 368.4 eV (FIG. 6E), corresponding to the reported binding energy of metallic silver (3 d$_{5/2}$) [23]. Given the antimicrobial activity of metallic silver [24], the bactericidal effect of the incorporated silver particles in the LbL film was tested in an in-vitro adhesion experiment with *Escherichia coli*. Surfaces were inoculated with 10$^5$ CFU of *E. coli* for four hours and then the number of dead bacteria attached to the surface counted. Ag nanoparticle-embedded LbL films showed enhanced anti-bacterial effects compared to the LbL film without Ag and the bare SiO$_x$ surface (FIG. 6F).

Example 6

Catechol-Functionalized Polymers as a Universal Primer

In this example, the inventors show that catechol-functionalized polymers of the present invention may be utilized as universal primers to facilitate subsequent LbL assembly with other polymers.

Figure 5:
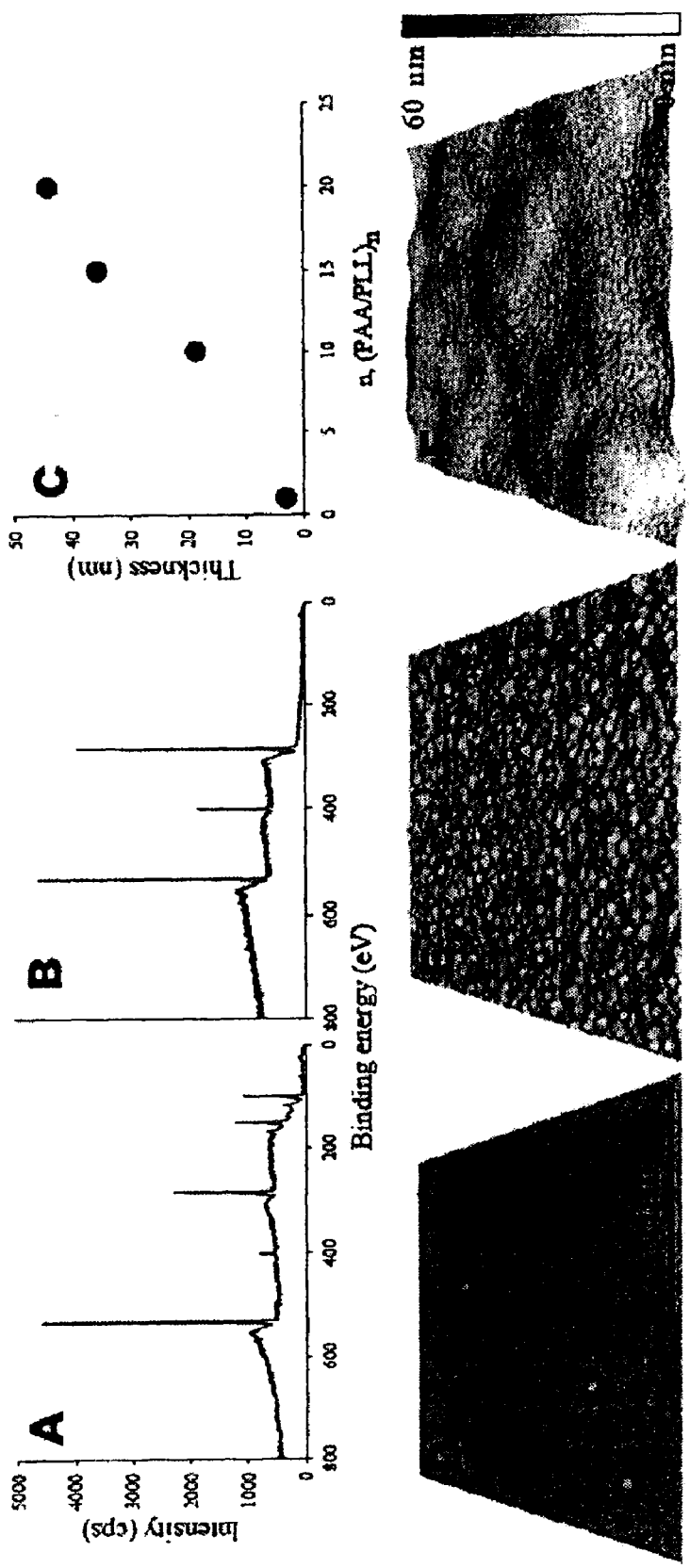
FIG. 5. Layer-by-layer assembly of PAA and PLL on PEI-C primed $SiO_x$. (A) XPS spectrum after single-step PEI-C adsorption on $SiO_x$ (B) XPS spectrum of (PEI-C/PAA)$_1$-(PLL/PAA)$_{10}$ adsorption on $SiO_x$. (C) Ellipsometry thickness of (PEI-catechol/PAA)$_1$-(PLL/PAA)$_n$. AFM image of a bare SiOx substrate (D), after (PEI-C/PAA)$_1$ deposition (E), and after (PEI-C/PAA)$_1$-(PLL/PAA)$_{10}$ deposition (F). AFM images showed relatively smooth topography of the polymeric deposition.

First, PEI-C was adsorbed as a primer layer on SiO$_x$, after which XPS analysis revealed peaks representative of both substrate (99.5 eV for Si2p, and 143 eV for Si2s) and polymer (285 eV for C1s and 400 eV for N1s) (FIG. 5A). The strong oxygen is (O1s) peak at 535 eV contains contributions from the silicon oxide and hydroxyl groups of the catechol. Adsorption of PAA followed by ten subsequent cycles of PLL/PAA adsorption [(PEI-C/PAA)$_1$-(PLL/PAA)$_{10}$] and XPS analysis resulted in complete suppression of substrate signals (Si2p,2s), leaving only C1s, N1s and O1s peaks corresponding to PAA and PLL (FIG. 5B). The thickness of the multilayer film was monitored by spectroscopic ellipsometry during LbL assembly, revealing a roughly linear increase in thickness with PLL/PAA deposition (FIG. 5C). Atomic force microscopy (AFM) imaging revealed a morphological transition from rough at an early stage to uniform film formation after many layers (FIG. 5D-F). The change of surface morphology could influence contact angle measurements.

Example 7

Synthesis of TiO$_2$ Nanosheets for LbL Assembly

In this example the inventors demonstrate the synthesis of TiO$_2$ nanosheets for use in LbL assembly.

Figure 7:
FIG. 7. Transmission electron microscopy images of $TiO_2$ nanosheets.
Figure 7:

Synthesis of TiO$_2$ nanosheets. The TiO$_2$ nanosheets were synthesized according to literature [25]. To a 50 mL crucible were added a well mixed mixture of Cs$_2$CO$_3$ (8.5 g, Sigma-Aldrich) and TiO$_2$ nanoparticles (10.8 g). The crucible was heated at 800° C. for 24 h and cooled down to room temperature. After re-mixing, the crucible was heated at 800° C. for another 24 h. A portion of the obtained powder (5 g) was treated with 150 mL 1N HCl solution. The mixture was shaken for a week on a flask shaker (St. John Associates) with renewal of the acid solution every 24 h. After filtration and wash with water, a portion of the resulting protonic titanate powder (5 g) was treated with 0.017 mol/L tetrabutylammonium hydroxide (Sigma-Aldrich). The mixture was shaken for 2 weeks to completely delaminate the titanate structure. Thus obtained opaque solution was set on the bench for one week. The upper suspension was decanted and used for the layer by layer coating. (The obtained suspension is quite stable at room temperature. There is only a little amount of precipitate at the bottom over a period of one and a half years.) Transmission electron microscopy of TiO$_2$ nanosheets revealed the lamellar nature of the material (FIG. 7).

Example 8

LbL Assembly with TiO$_2$ Nanosheets

In this example the inventors provide a representative example of LbL assembly using PAA-DHPA and TiO$_2$ nanosheets to form a multilayered nanocomposite.

LbL Assembly. The inventors used Si wafers and Si wafers coated with 15 nm thick layer of Ti by electron beam evaporation for the LbL substrates. The Si and Ti surfaces were ultrasonically cleaned in ultrapure water (UP), 2-propanol, petroleum ether and then acetone. After drying under a stream of N$_2$, the wafers were further cleaned with oxygen plasma for 3 minutes at <150 Torr. The inventors created a 4 mg/mL solution of PAA-DHPA in 50% dimethyl sulfoxide (DMSO) and 50% UP water and used HCl to lower its pH from 7.5 to 2.9. The inventors further created a 4 mg/mL solution of TiO$_2$ nanosheets in UP water. LBL was performed by submerging the Si and Ti-coated wafers in alternating solutions of PAA-DHPA and TiO$_2$ nanosheets. Each 5-minute submersion was followed by a 2-minute wash in 50% DMSO/50% UP water and 100% UP water to remove excess polymer molecules and nanosheets before submersing in the next solution. The inventors define a bilayer as one cycle of polymer and TiO$_2$ nanosheet adsorption so that ½ bilayer consists of only polymer.

Figure 8:
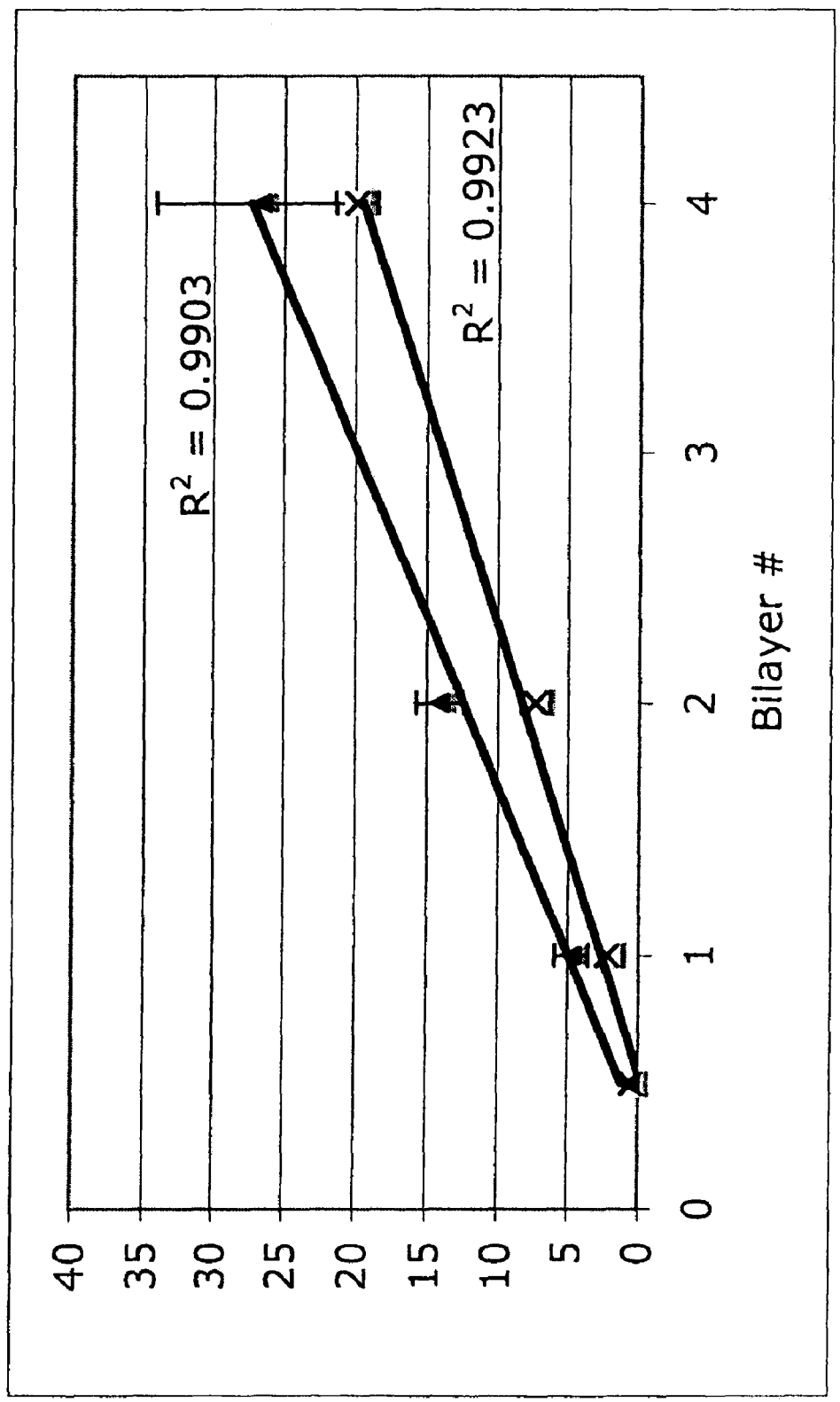
FIG. 8. Bilayer thickness as measured by ellipsometry for ½ bilayer, 1 bilayer, 2 bilayers and 4 bilayers on a Ti-coated substrate (triangles) and Si wafer (x's). In both cases, the trendline has a coefficient of determination above 0.99.

Surface characterization. Modification of the Si wafers and Ti-coated wafers with the LBL assembly of PAA-DHPA and TiO$_2$ nanosheets was confirmed by ellipsometry thickness measurements, contact angle measurements as well as elemental detection through Energy Dispersive X-ray Spectroscopy (EDS). Ellipsometer measurements were taken for samples coated with ½ bilayer, 1 bilayer, 2 bilayers and 4 bilayers in our LBL technique. The mean thicknesses determined for each bilayer are displayed in FIG. 8. For LBL on the Si wafer, we found a mean bilayer thickness of 3.63 nm. For Ti-coated wafers, the inventors found a mean bilayer thickness of 5.41 nm. In both cases, the mean thickness of the first layer of PAA-DHPA was only 0.5 nm.

Figure 9:
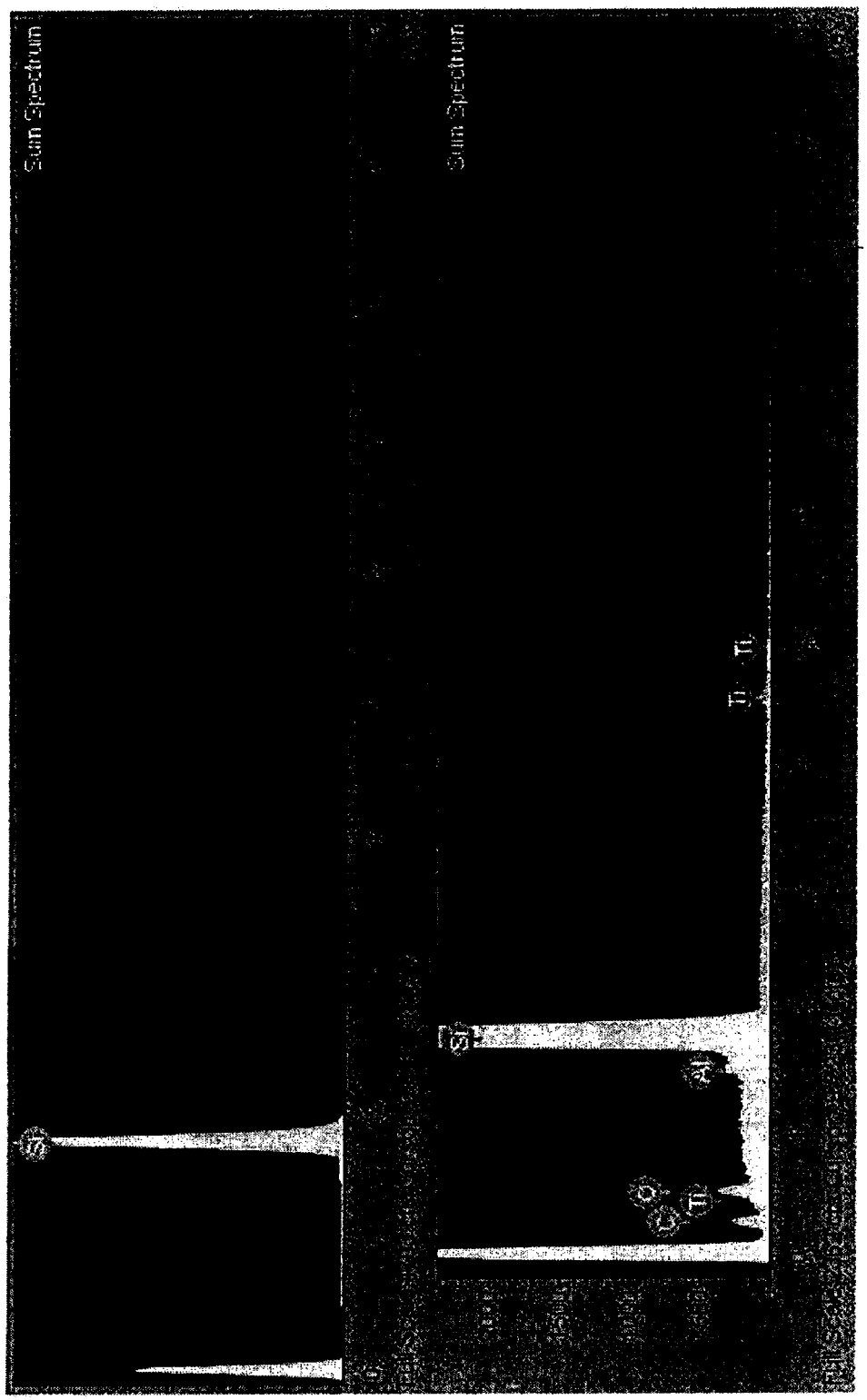
FIG. 9. EDS Spectra of Si wafer after ½ bilayer of PAA-DHPA (top) and after 4 bilayers of PAA-DHPA and $TiO_2$ nanosheets. At bilayer 4, note the C, O and Ti peaks in our sample.
Figure 10:
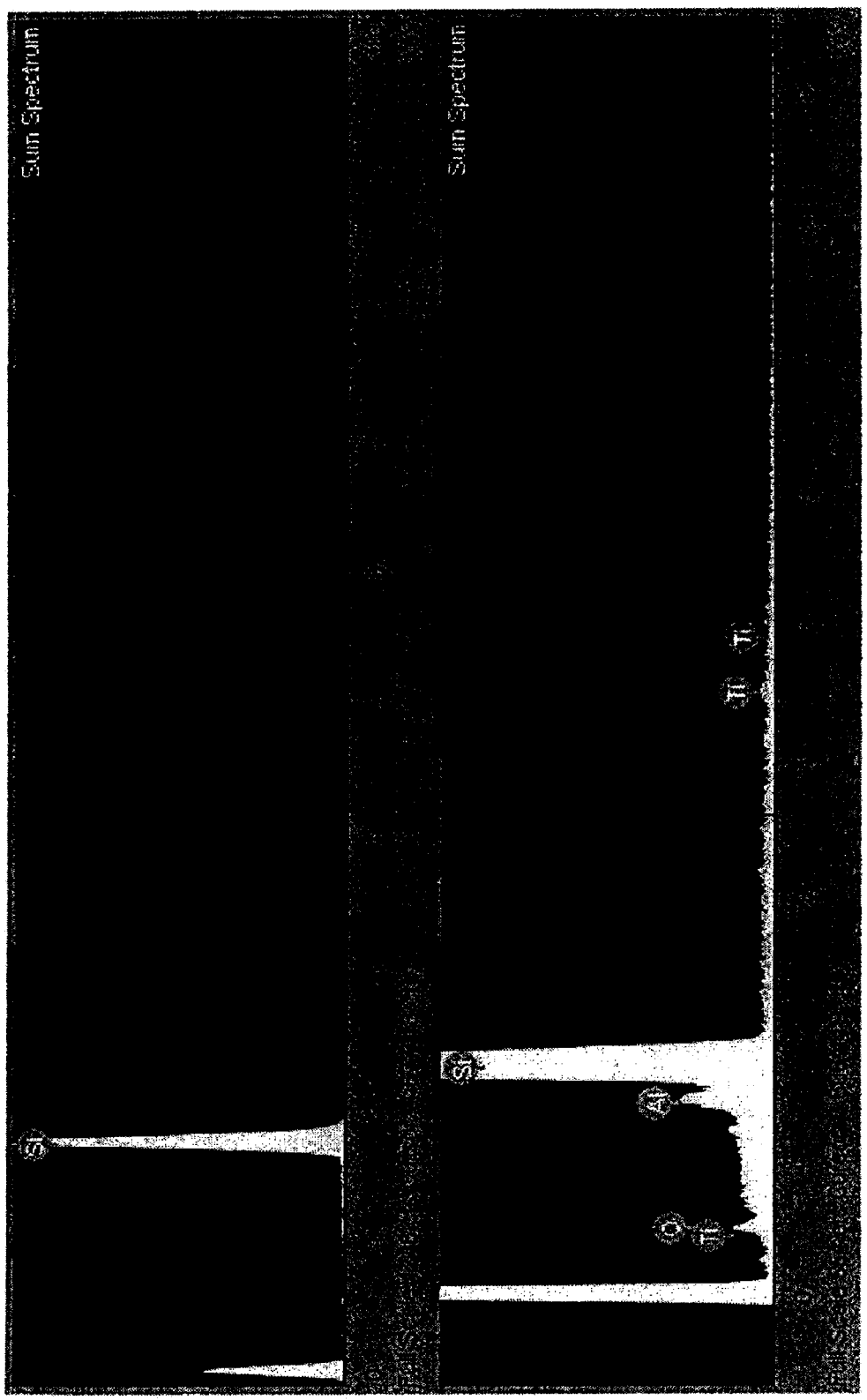
FIG. 10. EDS spectra of Ti-coated Si wafer after ½ bilayer of PAA-DHPA (top) and after 1 bilayer of PAA-DHPA and $TiO_2$ nanosheets. Due to the penetrative nature of EDS that the Si peak dominates the characterization and Ti is only detected at 1 bilayer.

EDS spectra were captured for all LBL samples. In FIG. 9, the Si substrates with ½ bilayer is dominated by a strong peak for Si, as expected. At 4 bilayers, the strong peak for Si is still present, but signals for C and O were also detected due to the presence of PAA-DHPA. Signals for Ti indicate successful adsorption of Ti nanosheets on the surfaces. In FIG. 10, a strong peak for Si dominates the Ti-coated substrate with ½ bilayer. At 1 bilayer, Ti is detected presumably due to the Ti coating and Ti nanosheets.

Advancing ($\theta_{adv}$) and static contact angles were measured for ultrapure water on the surfaces using an auto pipetting system (Rame'-Hart). The bare Si wafer had a static contact angle of 67.0°+/−5.9° and an advancing contact angle of 65.1°+/−2.3°. With the 4-cycle adsorption of titanium nanosheets, the static contact angle shifted to 37.6°+/−1.9° and the advancing contact angle shifted to 45.1°+/−1.8°. This shift in the direction of lower contact angles is consistent with the addition of hydrophilic TiO$_2$ nanosheets. Collectively, these results confirm the sequential adsorption of the LbL components on Si and Ti-coated substrata.

It should be noted that the above description, attached figures and their descriptions are intended to be illustrative and not limiting of this invention. Many themes and variations of this invention will be suggested to one skilled in this and, in light of the disclosure. All such themes and variations are within the contemplation hereof. For instance, while this invention has been described in conjunction with the various exemplary embodiments outlined above, various alternatives, modifications, variations, improvements, and/or substantial equivalents, whether known or that rare or may be presently unforeseen, may become apparent to those having at least ordinary skill in the art. Various changes may be made without departing from the spirit and scope of the invention. Therefore, the invention is intended to embrace all known or later-developed alternatives, modifications, variations, improvements, and/or substantial equivalents of these exemplary embodiments.

REFERENCES

[1] G. Decher, J.-D. Hong, *Makromol. Chem. Macromol. Symp.* 1991, 46, 321.
[2] J. L. Lutkenhaus et al., *J. Am. Chem. Soc.* 2005, 127, 17228.
[3] P. T. Hammond, *Adv. Mater.* 2004, 16, 1271.
[4] Z. Tang, Y. Wang, P. Podsiadlo, N. A. Kotov, *Adv. Mater.* 2006, 18, 3203.
[5] D. E. Bergbreiter, *Prog Polym. Sci.* 1994, 19, 529.
[6] M. Raposo et al., *Macromolecules* 1997, 30, 6095.
[7] M. C. Hsieh, R. J. Farris, T. J. McCarthy, *Macromolecules* 1997, 30, 8453.
[8] G. Price, F. Keen, A. A. Clifton, *Macromolecules* 1996, 29, 5664.
[9] H. Zhao et al., *Langmuir* 2007, 23, 1810.
[10] A. Delcorte, P. Bertrand, E. Wischerhoff, A. Laschewsky, *Langmuir* 1997, 13, 5125.
[11] A. Khademhosseini et al., *Adv. Mater.* 2003, 15, 1995.
[12] J. H. Waite, N. H. Andersen, S. Jewhurst, C. Sun., *J. Adhesion* 2005, 81, 1.
[13] D. J. Crisp, G. Walker, G. A. Young, A. B. Yule, *J. Coll. Inter. Sci.* 1985, 104, 40.
[14] H. Lee, S. M. Dellatore, W. M. Miller, P. B. Messersmith., *Science,* 2007, 318, 426
[15] C. Boura et al., *Biomaterials* 2003, 24, 3521.
[16] C. Picart et al., *Langmuir* 2001, 17, 7414.
[17] B. Thierry, F. M. Winnik, Y. Merhi, M. Tabrizian, *J. Am. Chem. Soc.* 2003, 125, 7494.
[18] J. Vicente et al., *Acta Oto-Laryngol.* 2006, 126, 144.
[19] V. Pardo-Yissar, E. Katz, O. Lioubashevski, I. Willner., *Langmuir* 2001, 17, 1110.
[20] H. Lee, N. F. Scherer, P. B. Messersmith, *Proc. Nat. Acad. Sci. USA* 2006, 103, 12999.
[21] H. Lee, B. P. Lee, P. B. Messersmith, *Nature* 2007, 448, 338.
[22] P. Podsiadlo et al., *Adv. Mater.* 2007, 19, 949.
[23] B. J. Murray et al., *Nano Lett* 2005, 5, 2319.
[24] C. H. Ho, J. Tobis, C. Sprich, R. Thomann, J. C. Tiller, *Adv. Mater.* 2004, 16, 957.
[25] T. Sasaki et al., *Chem. Mater.* 2002, 14, 3524-3530.

We claim:

1. A catechol-functionalized poly(ethyleneimine) polymer comprising at least 1 to 70 weight percent catechol functional groups, based on the total weight of the polymer.

2. The catechol-functionalized poly(ethyleneimine) polymer of claim 1 wherein the polymer comprises 50 to 65 weight percent catechol functional groups, based on the total weight of the polymer.

3. The catechol-functionalized poly(ethyleneimine) polymer of claim 1 wherein the polymer is anionic or cationic.

4. A catechol-functionalized polymer comprising the structure:

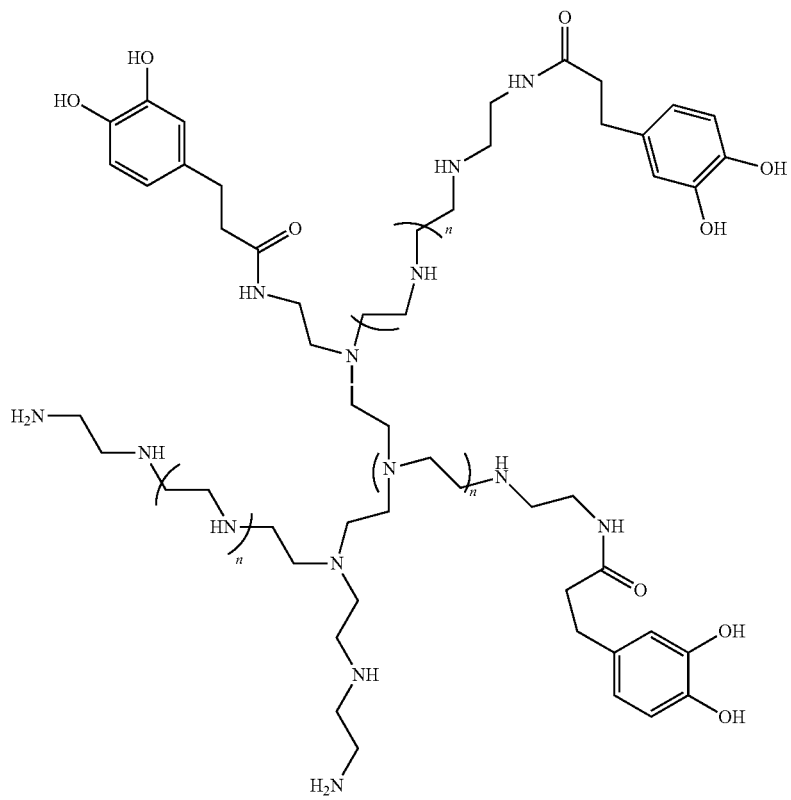
wherein "n" has a value in the range of from 10 to 10,000; and
wherein "m" has a value in the range of from 1 to 5,000.
5. The catechol-functionalized polymer of claim 4 wherein the polymer has a molecular weight of at least 25 kDa.
6. The catechol-functionalized polymer of claim 4 wherein the polymer has at least 20 to 60 percent catechol functional groups.
* * * * *